United States Patent Office 3,641,057
Patented Feb. 8, 1972

3,641,057
4,5-DICHLORO-1,3-DIOXACYCLOPENTENONE
Hans-Dieter Scharf, Wilhelm Droste, and Rita Liebig, Bonn, Germany, assignors to E. Merck Aktiengesellschaft, Darmstadt, Germany
No Drawing. Filed Feb. 3, 1969, Ser. No. 796,200
Claims priority, application Germany, July 2, 1968, P 17 68 801.6
Int. Cl. C07d 13/04, 13/06
U.S. Cl. 260—340.2                            1 Claim

ABSTRACT OF THE DISCLOSURE

The novel compound 4,5-dichloro-1,3-dioxacyclopentenone (dichlorovinylene-carbonate), useful as a stabilizer, a cross linking agent or an intermediate, is produced by reacting tetrachloroethylene carbonate with zinc, copper or copper plated zinc in the presence of catalytic amounts of dimethyl-formamide.

---

The invention relates to 4,5-dichloro-1,3-dioxacyclopentenone.

An object of this invention is to provide a novel compound useful as a stabilizer, a cross linking agent, or an intermediate.

Another object is to provide a process for producing the novel compound.

Upon further study of the specification and claim, other objects and advantages of the present invention will become apparent.

To attain these objects there is provided the novel compound 4,5-dichloro-1,3-dioxacyclopentenone, also named dichlorovinylene-carbonate, of the following formula:

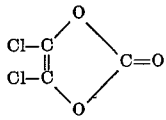

The above compound is useful as a stabilizer, f.e. for hydrocarbons, such as liquid saturated hydrocarbons applied as solvents, since it reacts with contaminations containing multiple bonds and/or —OH, —SH and/or —NH groups. It is also useful as a cross linking agent for unsaturated macromolecules as well as for macromolecules having —OH, —SH and/or —NH terminal groups.

Dichlorovinylene-carbonate is, in addition, useful as a chemical intermediate for the manufacture of known as well as novel substances of various uses. Thus, it adds to double bonds; the resultant cyclobutylene-carbonates are hydrolytically converted under acidic or alkaline conditions, to α-hydroxycyclopropane carboxylic acid derivatives. The reaction with compounds containing functional groups —YH (Y=O, S, NH) progresses, however, in the following manner:

(1) Under cold conditions, e.g. 20–50° C.

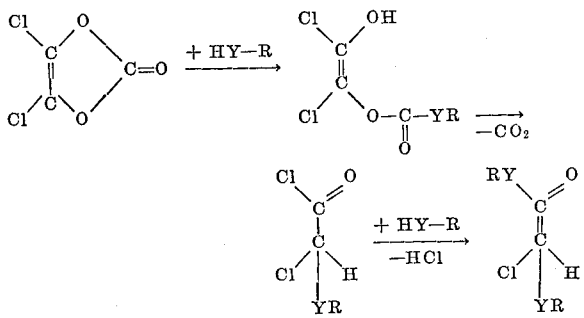

(2) Under warm conditions, e.g. 70–100° C.

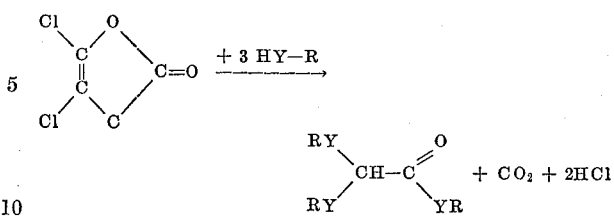

(R=an organic radical) R is preferably an alkyl or aryl group which may be substituted, if desired. In particular, is hydrocarbon alkyl of 1 to 4 carbon atoms or hydrocarbon aryl of 6 to 10 carbon atoms.

Of the large number of useful synthetic sequences involving dichlorovinylene carbonate as an intermediate the following are selected by way of example:

(1) Light-induced addition of dichlorovinylene carbonate to isobutylene in pure acetone yields 1,5-dichloro-6,6-dimethyl-2,4-dioxabicycle-(3,2,0)-heptan-3-one which by stirring in aqueous dioxane at room temperature and acidification is hydrolyzed to give 1-hydroxy-2,2-dimethylcyclopropanecarboxylic acid. This acid can be isomerized easily to 4-methyl-2-oxopentanoic acid which is reacted with sodium in liquid ammonia to yield leucine (2-amino-4-methylpentanoic acid) which is an essential nutrient.

Similarly, other amino acids can be synthetized from dichlorovinylene carbonate by selecting appropriate olefins.

(2) Similarly, addition of dichlorovinylene carbonate to isoprene yields 1,6-dichloro-3-methyl-7,9-dioxabicyclo-(4,3,0)-non-3-en-8-one which is dehydrochlorinated with bases to give 4-methyl-pyrocatechol usable in photography.

(3) Addition of dichlorovinylene carbonate to 2,5-dimethyl - 2,4 - hexadiene leads to 1,5-dichloro-6,6-dimethyl-7-(2,2 - dimethylvinyl) - 2,4-dioxabicyclo-(3,2,0)-heptan-3- one and to 1-hydroxy-2,2-dimethyl-3-(2,2-dimethylvinyl)-cyclopropanecarboxylic acid. Reductive removal of the hydroxyl group yields chrysanthemum-monocarboxylic acid certain esters of which are components of some known insecticides.

Other specific novel compounds can be made using dichlorovinylene carbonate as an intermediate, including the following:

With tetramethylethylene:
1,5-dichloro - 6,6,7,7 - tetramethyl - 2,4-dioxabicyclo-(3,2,0)-heptan-3-one, M.P. 183° C.;
And therefrom:
1 - hydroxy - 2,2,3,3 - tetramethylcyclopropanecarboxylic acid, M.P. 127° C.;
With cyclopentene:
1,7 - dichloro - 8,10 - dioxatricyclo-(5,3,0,0$^{2,6}$)-decan-9-one, two isomers, M.P. 53° C. and 96° C., respectively;
And therefrom:
2 - hydroxybicyclo - (3,1,0) - hexane-2-carboxylic acid, M.P. 106° C.

For producing the 4,5-dichloro-1,3-dioxacyclopentenone, tetrachloroethylene carbonate (4,4,5,5-tetrachloro-1,3-dioxa-cyclopentanone) known from U.S. Pat. 2,816,-287 and French Pat. 1,363,740, obtained by exhaustive chlorination of ethylene carbonate, is treated with a dechlorination agent, preferably a metal, such as zinc, copper, copper-plated zinc, magnesium, or cadmium. Usually, 1 to 5, particularly 2 to 4, preferably 2.5 to 3 gram atoms of the metal per mol of the tetrachloride are applied.

Instead of pure metals, technical grade metals can be used, e.g. those containing metallic impurities (such as Fe, Cu, As, Sb, etc.). The use of technical grade zinc is preferred. The reaction is preferably conducted in the presence of catalytic amounts of dimethyl formamide, particularly about 2 to 4 weight percent based on the tetrachloride. The conversion is advantageously conducted in an inert organic solvent, preferably in an ether such as diethyl ether, diisopropyl ether, tetrahydrofuran, or dioxane. The exothermic reaction can easily be regulated by cooling or warming, the preferred operating temperature range being about 20 to 50, particularly 30 to 40° C. Atmospheric, subatmospheric or superatmospheric pressures can be used. High yields are obtained.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

In a one-liter three-necked flask, equipped with a stirrer, a reflux condenser and a dropping funnel, 140 g. of technical grade zinc containing copper impurities is admixed with 5 ml. of dimethylformamide. To this mixture there are slowly added in a dropwise manner 180 g. of tetrachloro-ethylene carbonate dissolved in 300 ml. of dry ether. A vigorous reaction occurs. (The tetrachloro-ethylene carbonate was made in accordance with U.S. Pat. 2,816,287.)

After the entire amount of tetrachloro-ethylene carbonate is added, the mixture is heated for about 5 hours under reflux conditions, the precipitate is then filtered off and washed with 300 ml. of ether. The combined ethereal solutions are dried, and after the ether is distilled off, the residue is distilled to yield liquid 4,5-dichloro-1,3-dioxacyclopentenone which has the following properties:

Boiling point—39–40° C./10 mm. Hg
Boiling point—147° C./760 mm. Hg

The I.R.-carbonyl lines are at 1920, 1870, 1835 and 1820 cm.$^{-1}$.

Yield: 105 g. (85% of theory).
Characteristics: colorless, lacrimatory liquid which solidifies to colorless crystals under refrigeration.

EXAMPLE 2

Example 1 is repeated except that the technical grade zinc is replaced by pure zinc coated with copper according to the method of E. LeGoff, J. Org. Chem. 29, p, 2049 (1964). Similar results are obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. 4,5-dichloro-1,3-dioxacyclopentenone.

References Cited

UNITED STATES PATENTS 2,918,478   12/1959   Newman _____ 260—340.2
2,816,287   12/1957   Ellingboe et al. _____ 260—340.2

OTHER REFERENCES

Farnum et al., Tetrahedron Letters No. 43, pp. 3861–2 (1965).

NORMA S. MILESTONE, Primary Examiner

U.S. Cl. X.R.

260—455 R, 463, 482 C, 484 R, 544 Y, 561 A, 561 HL, 514 R, 526 R, 534 R, 619 R